(No Model.)

G. L. JAEGER.
MACHINE FOR CRUSHING AND COMPACTING PAPER STOCK, &c.

No. 254,328. Patented Feb. 28, 1882.

Witnesses
Otto Hufeland
William Miller

Inventor.
Gustav L Jaeger
by Van Santvoord & Hauff
his att'ys.

UNITED STATES PATENT OFFICE.

GUSTAV L. JAEGER, OF NEW YORK, N. Y.

MACHINE FOR CRUSHING AND COMPACTING PAPER-STOCK, &c.

SPECIFICATION forming part of Letters Patent No. 254,328, dated February 28, 1882.

Application filed November 26, 1881. (No model.)

*To all whom it may concern:*

Be it known that I, GUSTAV L. JAEGER, a citizen of the United States, residing at New York, in the county and State of New York, have invented new and useful Improvements in Machines for Crushing and Compacting Paper-Stock, and in the product thereof, of which the following is a specification.

The object of this invention is to produce a machine for compacting straw and other stalks or vegetable fiber to be reduced to paper-pulp by disintegration, and also when stalks are used to produce a package thereof adapted to be ground across the grain.

Figure 1:
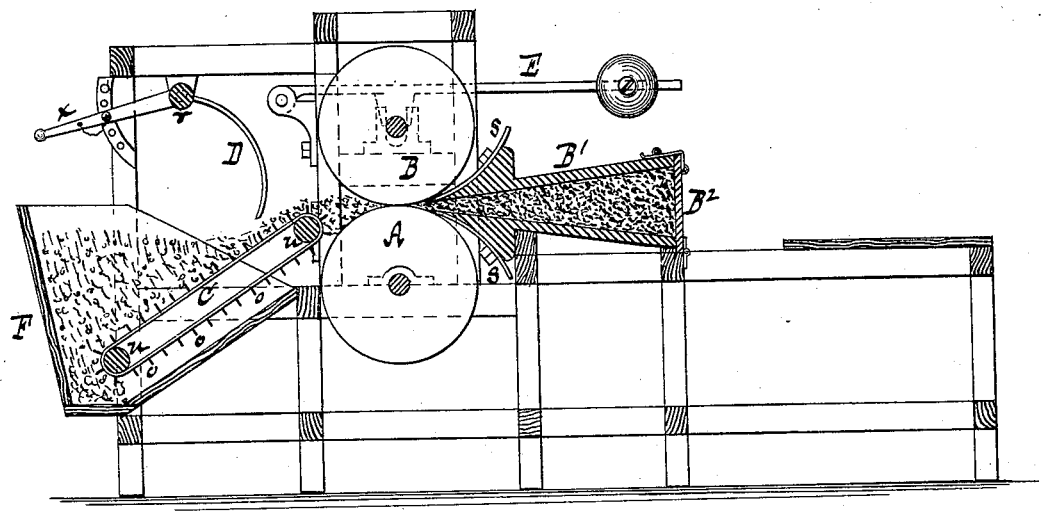
Figure 2:
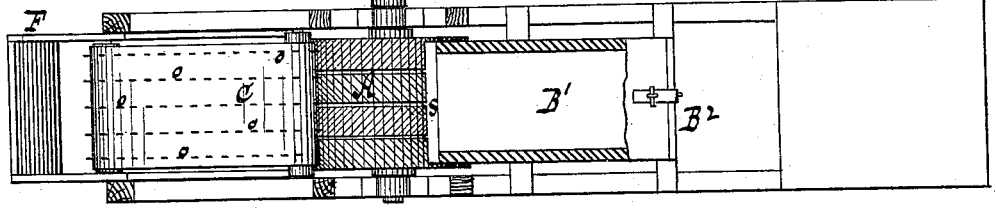
Figure 4:
Figure 5:
Figure 3:
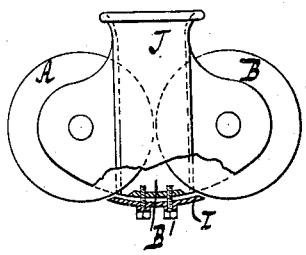

This invention is illustrated in the accompanying drawings, in which Figure 1 shows the machine in longitudinal vertical section. Fig. 2 is a horizontal section. Fig. 3 shows a modification. Fig. 4 is a plan view of the package. Fig. 5 illustrates the manner of putting up the package for transportation.

Similar letters indicate corresponding parts.

The letters A B designate two rollers arranged to revolve in superficial contact with each other, one over the other. B' indicates a receiver having its mouth arranged opposite to the bite of the rollers; C, an endless feeder, armed with teeth $o$ for delivering the material to the rollers, and D an adjustable clearing-fork, having its tines arranged above the endless feeder.

The lower roller, A, is mounted in fixed bearings and the upper roller, B, in slotted bearings, allowing it to yield, the same being depressed upon the lower roller by a weighted lever, E, or other suitable means.

The receiver B' consists of a box or trunk, and is preferably furnished with "doctors" $s$, impinging against the rollers A B for stripping the material therefrom. If desired, the edges of those doctors may be toothed to catch in grooves formed in the rollers, as indicated in Fig. 2. At its outer or rear end the receiver B' is provided with a cover, B², allowing the removal of its contents.

The endless feeder C consists of an apron or chain traveling in the proper direction on rollers $u$, and it is preferably arranged in a hopper, F, in an inclined position, so that by placing the material into the latter it is caught by the teeth of the feeder.

The clearing-fork D is a fixture of a rock-shaft, $v$, provided with a handle, $x$, for turning and locking it in the desired position, and by simply turning the shaft the tines of the fork can be adjusted toward or away from the feeder. Other means, however, can also be used for adjusting the fork. As the straw or other material is carried up on the feeder C the surplus portion thereof is caught by the tines of the fork D, and thereby detained or thrown back, so that only a given quantity is delivered to the rollers A B, and the danger of choking is avoided. As the material passes between the rollers A B it is crushed and then forced into the receiver B', so as to become compacted therein, and thus brought to a condition for disintegration by grinding.

When it is desired to compact the material for future use the receiver B' is provided with the detachable cover B², allowing the removal of the material, the same being thus obtained in compact or solidified packages of uniform size; but the material can also be fed directly to a grinding-wheel, in which case the base of the receiver is left open and brought close up to the grinding-wheel.

In order to avoid any strain to the machine when the receiver has been filled to its entire capacity, I use a divided shaft, G, for imparting motion to the working parts, the sections of which shaft are united by a spring-toothed clutch, H, allowing the driving section to revolve independently of the other or driven section. This clutch H also acts as a signal to indicate when the receiver has become filled, because the parts of the clutch thereupon ride over each other, producing a rattling noise.

When the machine is used for compacting straw or other stalks the latter are fed to the machine as nearly as possible parallel to the axis of the rollers A B, the feeder C being adapted to this purpose, and in this manner all the stalks of the package or packages obtained are brought approximately parallel to each other, as indicated in Fig. 4. This arrangement of the stalks allows the package to be ground across the grain, which is a desideratum, because favorable to a flaky condition of the pulp.

The receiver B' is made to taper in longitudinal section in order to facilitate the removal of its contents, and the packages taking a corresponding shape, they can be laid upon each other in reverse positions, as shown in Fig. 5, for transportation.

In some cases the compacting-rollers A B may be arranged side by side, as shown in Fig. 3, and may have grinding-surfaces adapted not only to feed and compact the material in the receiver, but also disintegrate the same. A gage, I, moreover, can be used to regulate the escape of material from the receiver, the material being introduced through a hopper, J, and the quantity supplied to the receiver being determined by adjusting the rollers toward or away from each other.

What I claim as new, and desire to secure by Letters Patent, is—

1. The combination, substantially as hereinbefore set forth, of the compacting-rollers, arranged to revolve in superficial contact with each other, and the receiver, having its mouth arranged opposite to the bite of the rollers.

2. The combination, substantially as hereinbefore set forth, of the compound crushing and compacting rollers, arranged to revolve in superficial contact with each other, and the receiver, having its mouth arranged opposite to the bite of the rollers.

3. The combination, substantially as hereinbefore set forth, of the compound crushing and compacting rollers, arranged to revolve in superficial contact with each other, the endless feeder, armed with teeth for delivering the material to the rollers, and the receiver, having its mouth arranged opposite to the bite of the rollers.

4. The combination, substantially as hereinbefore set forth, of the endless toothed feeder, the adjustable clearing-fork, having its tines arranged above the surface of the feeder, the compound crushing and compacting rollers, and the receiver, for the purpose specified.

5. A package of straw or other stalks compacted or solidified, with its component particles laid approximately parallel to each other, for the purpose specified.

In testimony whereof I have hereunto set my hand and seal in the presence of two subscribing witnesses.

GUSTAV L. JAEGER. [L. S.]

Witnesses:
 W. HAUFF,
 CHAS. WAHLERS.